Jan. 2, 1968  G. A. TIBY  3,361,171
APPARATUS FOR CUTTING FOOD ARTICLES
Filed Jan. 11, 1966  2 Sheets-Sheet 1
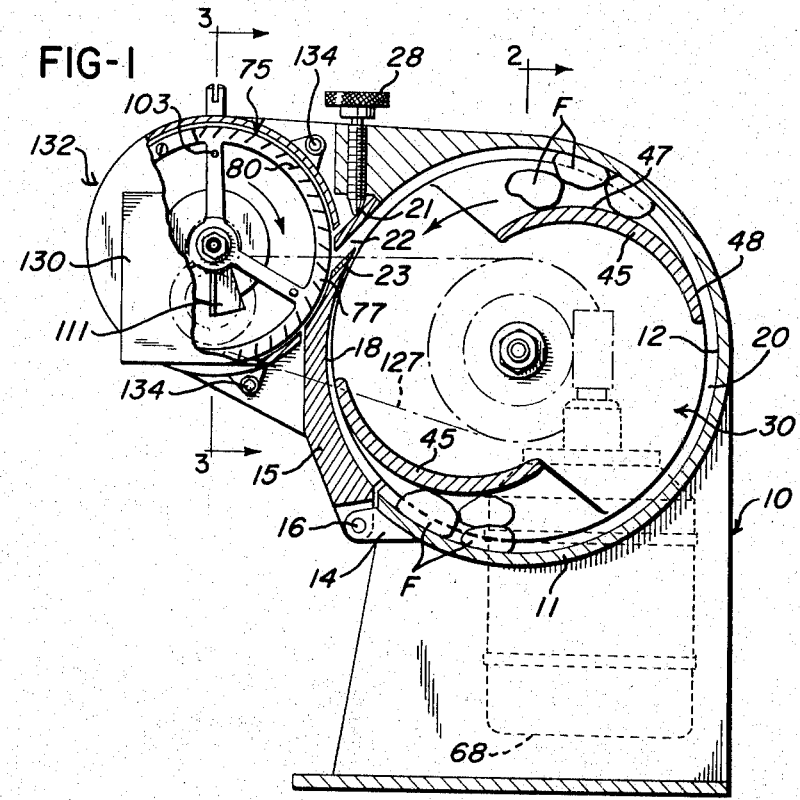
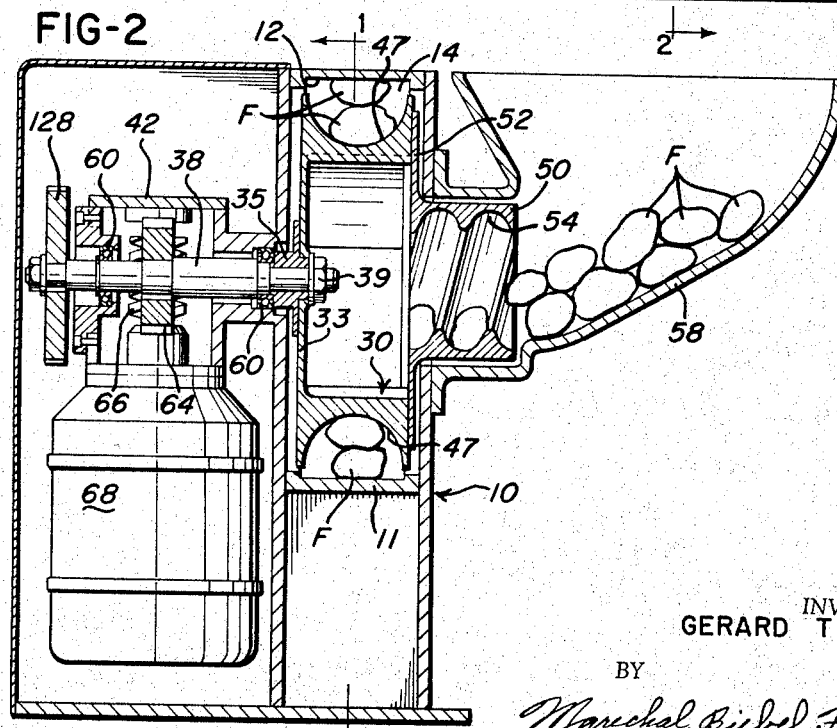
INVENTOR.
GERARD TIBY
BY
Marechal, Biebel, French & Bugg
ATTORNEYS

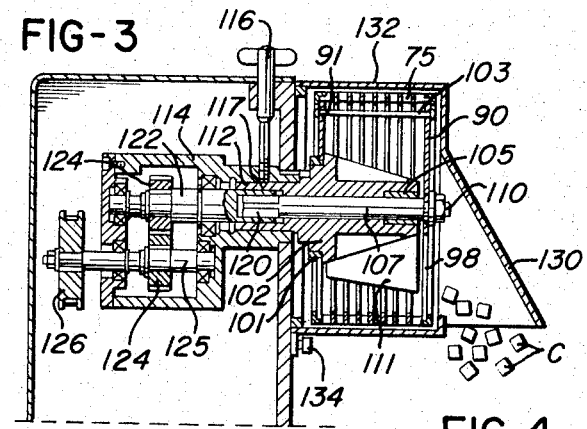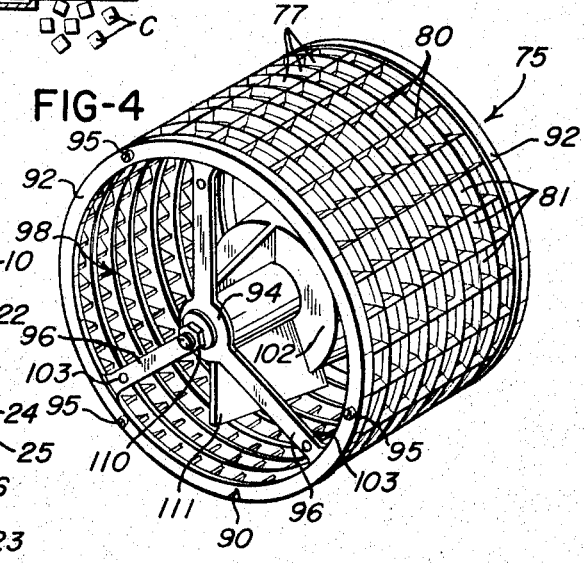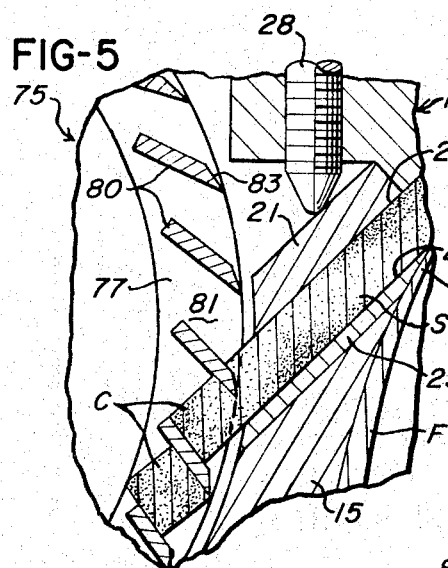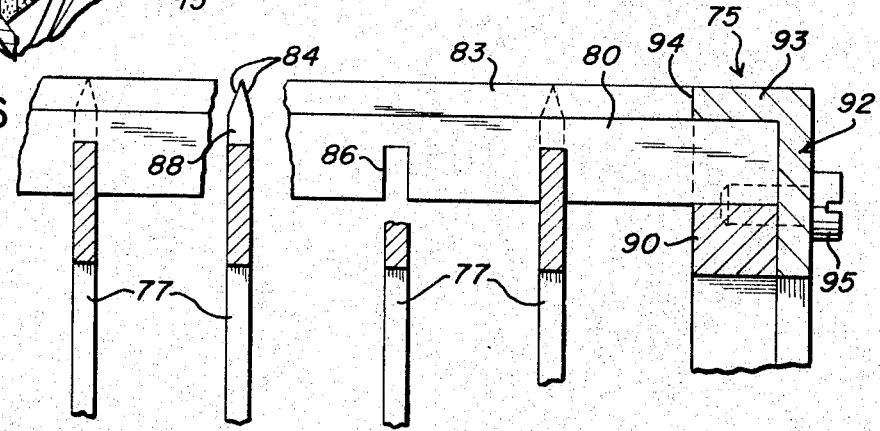

United States Patent Office 3,361,171
Patented Jan. 2, 1968

3,361,171
APPARATUS FOR CUTTING FOOD ARTICLES
Gerard A. Tiby, Ivry sur Seine, France, assignor to The Hobart Manufacturing Company, Troy, Ohio, a corporation of Ohio
Filed Jan. 11, 1966, Ser. No. 520,000
7 Claims. (Cl. 146—78)

This invention relates to an apparatus for cutting vegetables and fruits, and more particularly, to an improved high capacity apparatus which is adaptable to slice or dice food articles into smaller pieces without mashing, squeezing or otherwise deforming the pieces.

The present invention is generally related to the type of cutting or slicing apparatus shown in Patent No. 2,923,337, issued Feb. 2, 1960 and assigned to the same assignee as the present invention. That is, the apparatus of the present invention is directed to improvements in the apparatus shown in the above patent whereby food articles such as whole potatoes, carrots, pears or the like, can be automatically delivered in the form of slices, strips or cubes according to whichever form is desired.

Thus it is a primary object of the present invention to provide a novel high capacity cutting apparatus which is adapted to receive a continuous supply or a batch of food articles, as for example, a supply of whole potatoes, and automatically slice or dice the articles into either cubes, strips or slices.

Another object of the invention is to provide an apparatus as outlined above wherein the articles are sliced into cubes without being mashed or squeezed so that substantially all of the original juices are retained within the cubes.

Still a further object is to provide an apparatus as outlined above, which is easy and convenient to clean after completing the cutting operation.

Another object is to provide a novel apparatus which can form food articles such as whole carrots and potatoes into cubes which are substantially uniform in dimension.

As another object, the invention provides an apparatus, as outlined above, which is easily adapted to form the food articles into either cubes, strips or slices of various sizes simply by interchanging an easily removable cutter member.

It is an also an object of the invention to provide an apparatus as outlined above wherein a cutting cage is employed to form slices of food articles into cubes and is so positioned in relation to the slice forming means to be self-feeding so that the slices are not compressed or restricted.

Other objects and advantages of the invention will be apparent from the following description, the accompanying drawings and the appended claims.

In the drawings:

FIG. 1 is an elevational view of an apparatus formed in accordance with the invention as viewed along the line 1—1 of FIG. 2 and showing the general overall spaced relationship of the major components;

FIG. 2 is an elevational view in axial section of the apparatus as viewed along the line 2—2 of FIG. 1;

FIG. 3 is an elevational view in axial section as viewed along the line 3—3 of FIG. 1;

FIG. 4 is a perspective view of the cutting or dicing cage as shown in elevation in FIG. 1;

FIG. 5 is an enlarged fragmentary detailed view showing the spaced relationship between the dicing cage and the stationary knife for forming a slice; and FIG. 6 is an enlarged fragmentary view of the dicing cage showing the assembly of the cutting blades.

Referring to the drawings which illustrate a preferred embodiment of the present invention, the apparatus shown in FIGS. 1 and 2 generally includes a casing or housing 10 including a portion 11 defining a smooth part cylindrical internal surface 12. Extending from the lower portion of the housing portion 11 are a pair of ears 14 which pivotally support a door member 15 by a pin 16. The internal curved surface 18 of the door member 15 complements the surface 12 to form generally a cylindrically shaped chamber 20.

Formed in the upper portion 21 (FIG. 5) of the door member 15 is a rectangular passageway 22 in which is mounted a cutting knife 23 having a flat upper surface 24 and a beveled or sharpened cutting edge 25. As shown in FIG. 1, the passageway 22 extends tangentially and downwardly from the upper portion of the chamber 20. The door member 15 and cutting knife 23 are releasably secured to the housing 10 in the position shown in FIG. 1 by a thumb screw 28 so that the cutting edge 25 of the knife 23 projects slightly inwardly of a true cylindrical extension of the surface 12.

A drum-like feed member 30 is positioned within the chamber 20 and includes a rear wall 33 (FIG. 2) which is mounted on a hub 35 removably secured on the end of a support shaft 38 by a nut 39. Integrally formed as part of the feed member 30 are a pair of diametrically spaced curved walls 45 which provide a camming surface 47 having generally a semi-circular cross-sectional configuration (FIG. 2) which gradually reduces towards the outer periphery of the feed member 30 to provide an axially flat surface portion 48 (FIG. 1) at the outer extremities of the feed member 30.

Defining an inlet for the feed member 30 is a cylindrical portion 50 having an outwardly extending annular flange 52 which mounts on the forward ends of the walls 45. Formed integrally within the cylindrical inlet portion 50 is a pair of spiral grooves 54 which are adapted to feed the food articles F, such as the potatoes shown in FIGS. 1 and 2, from a hopper 58 mounted on the housing 10 into the space defined between the rear wall 33 and flange 52 of the feed member 30. The semi-circular cross-sectional contour of the walls 45 has been found desirable in aiding the orientation of the food articles F within the feed member 30 so that the articles are urged generally into alignment with the center portion of the curved surfaces 47.

As mentioned above, the feed member 30 is carried by the hub 35 which is mounted on the shaft 38 which, in turn, is rotatably supported by a pair of ball bearings 60. The shaft 38 is driven through a helical gear 64 mounted thereon by a worm gear 66 mounted on the shaft extending vertically from a motor 68. Thus the food articles F are fed from the hopper 58 by the spiral grooves 54 into the feed member 30 as the member is rotated by the motor 68. Simultaneously, the inner leading edges of the curved walls 45 scoop up the food articles F and carry them counterclockwise (FIG. 1) around the chamber 20 in sliding contact with the internal surface 12.

As the food articles successively pass the cutting edge 25 of the stationary knife 23, a slice S (FIG. 5) is formed and is fed through the passageway 22 by the drum surface 48. To change the thickness of a slice, the height of the passageway 22 is modified. This may be accomplished by interchanging the door member 18 with another door member having a different size passageway 22.

Referring to FIGS. 1 and 3, positioned adjacent the outer end of the passageway 22 is a drum-like dicing or cutting cage 75 which includes a series of parallel spaced cutting rings 77 (FIG. 4) connected by a series of axially extending straight cutting blades 80. The cutting rings 77 and cutting blades 80 are spaced apart as shown in FIG. 4 to define a plurality of radially extending and generally square openings 81 around the periphery of the cage 75.

As shown in the enlarged view of FIG. 6, the outer edges of the cutting blades 80 and the rings 77 are provided with beveled surfaces 83 and 84 respectively to define a sharp cutting edge. In addition, the inner portion of each blade 80 is provided with a series of parallel slots 86 for receiving the cuttings rings 77 which are also provided with a series of corresponding slots 88 formed within the leading edge of each ring for providing an interlocking and rigid connection between the cuttings rings 77 and the cutting blades 80.

The straight cutting blades 80 are carried by a pair of end support members 90 and 91 (FIG. 3) in which are formed a series of slots for receiving the end portions of the cutting blades in relation to a radially extending reference plane passing through each blade. The end portions of the blades 80 are secured within the slots formed in the support members 90 and 91 by a pair of angled retaining rings 92 (FIG. 6) each having a cylindrical flange portion 93 which is received within a notch 94 formed in the end portion of each blade 80. The rings 92 are secured to the support members 90 and 91 by a series of screws 95.

As shown in FIG. 4, the outer support member 90 includes a hub portion 94 integrally connected by a series of three spoke members 96 which define sector shaped openings 98 therebetween. The inner support member 91 (FIG. 3) carries a low friction plastic annular bearing 101 which is rotatably supported by a stationary hub 102 and is rigidly connected to the outer support member 90 by a series of three axially extending bolts 103 which are secured to the corresponding spoke member 96. Extending through an opening formed within the hub 102 and rotatably supported by a bearing 105 (FIG. 3) mounted within the opening is a spindle 107 having a projecting end portion on which the hub portion 94 of the end ring 90 is mounted and secured by a nut 110. Referring to FIGS. 1, 3 and 4, mounted on a lower portion of the stationary hub member 102 in an inclined position is a guide plate 111 which has an outer edge portion extending towards the inner edges of the cutting rings 77.

The inner cylindrical portion 112 (FIG. 3) of the hollow hub 102 is mounted within an opening formed within a gearbox housing 114 and is retained for quick removal within the opening by a hand screw 116 having a pointed end which engages a corresponding depression 117 formed within the hub portion 112. The inner end of the spindle 107 is driven through a square socket drive connection 120 by a shaft 122 which is in turn, driven through the meshing gears 124 by a shaft 125 so that the direction of rotation of the shaft 122 is opposite to that of the shaft 125.

Mounted on the projecting end portion of the shaft 125 is a pulley 126 which is driven through a belt 127 (FIG. 1) by a somewhat larger pulley 128 (FIG. 2) mounted on the drive shaft 38 for the feed member 30. Preferably, the pulleys 126 and 128 are formed with peripheral teeth and corresponding teeth are provided on the inner surface of the drive belt 127 to provide a positive non-slip drive between the shaft 38 and the shaft 122 so that the dicing cage 75 rotates in a reverse direction but in positive timed relationship with the feed member 30.

As shown in FIG. 5, by positioning the cage 75 slightly below a tangent position within the passageway 22 and by angularly mounting the cutting blades 80 around the periphery of the cage 75, when the cage 75 is rotated, the blades 80 pass the discharge end of the passageway 22 and cut into the slice S substantially normal to the top surface 24 of the knife 23 to form or dice the slices S into cubes C. Thus, each slice is cut squarely along parallel lateral and longitudinal planes so that the cubes C are formed with substantially right angled surfaces.

As each cube C is pushed through its corresponding opening 81 by a successively formed cube, the cubes fall into the cage 75 where they are directed by the guide plate 111 through the openings 98 formed in the support member 90. The cubes C are then directed downwardly into a suitable container by a deflector 130 which extends from a cover 132 (FIG. 1) enclosing the cage 75 and removably secured to the housing 10 by the thumb screws 134.

The relative position between the cage 75 and the passageway 22 provides a self-feeding action by the cage 75 so that as soon as an end portion of a slice S is engaged by a cutting blade 80, the slice is effectively pulled into the successive cutting blades 80. Thus the cage 75 cooperates with the feed member 30 in moving the slices S through the passageway 22 so that the slices are not significantly compressed or squeezed within the passageway. This self-feeding action is desirable in that it assures that the last formed slice is diced into cubes and does not remain within the passageway 22. Preferably, the peripheral speed of the cage 75 is slightly greater than the peripheral speed of the feed member 30 so that the cage has a velocity component in a direction parallel with the passageway 22, which is substantially equal to the tangential velocity of the feed member 30.

When it is desired to form the slices S into strips rather than cubes, the cage 75, hub member 102 and spindle 107 are removed as a unit after the cover 132 is removed by releasing the screw 116. The door member 15 is then removed simply by pulling the pin 16 and is replaced by another door member having a series of uniformly spaced knives (not shown) extending vertically through the passageway 22 and which cooperate with the knife 23 to form the strips. On the other hand, when it is desirable to form the food articles into slices, only the cover member 132 and cage unit are removed and the slices are collected as they are fed from the passageway 22.

As can be seen from the drawings and the above description, an apparatus formed in accordance with the present invention provides several desirable features and advantages. Basically, the apparatus can be used for conveniently forming either slices, strips or cubes whichever is desired. Thus, by simply removing the cover 132 and releasing the hand screw 116, the cage 75, hub member 102 and spindle 107 can be easily removed for forming slices. The door member 15 can also be quickly and conveniently interchanged for forming strips of different sizes or slices of different sizes. Furthermore, the convenient removability of the cage 75 provides for quick interchangement of cages for forming cubes of different sizes.

Another significant advantage is provided by the spaced relationship between the cutting cage 75 and the passageway 22. That is, by arranging the cutting blades 80 on the cage 75 so that each blade cuts into a slice S while the blade is positioned substantially at right angles to the flat surface 24 of the knife 23, the cage cooperates with the feed member 30 and pulls each slice S through the passageway 22 to prevent the slices from being squeezed or compressed. The easy removability of the cage 75 and of the door 15 also provides for convenient cleaning of the cutting rings 77, blades 80 and knife 23 in addition to the cleaning of the hub 102, feed member 30 and other surfaces which are contacted by the food articles.

While the form of apparatus herein described constitutes a preferred embodiment of the nivention, it is to be understood that the invention is not limited to this precise form of apparatus, and that changes may be made therein without departing from the scope of the invention which is defined in the appended claims.

What is claimed is:

1. An improved apparatus for successively cutting food articles such as vegetables and fruits into small cubes without compressing the cubes, comprising a housing including surface means defining generally a cylindrical chamber, a feed member rotatably mounted within said chamber and adapted to receive a supply of articles, means on said feed member to carry the articles around said chamber in sliding contact with said surface means, means defining a discharge passage extending from said chamber and positioned generally tangentially thereto, stationary knife means associated with said passage for cutting the articles carried by said feed member into slices as the articles are fed successively past said knife means, a generally cylindrical hollow cutter member having peripheral knife means for cutting each slice extending through said passage into a plurality of cubes, means for rotatably supporting said cutter member in relation to said passage so that the slices move directly from said passage into engagement with said knife means on said cutter member, and means for driving said feed member and said cutter member in timed relationship to provide cooperation therebetween for moving the slices through said passage to avoid squeezing of the slices or the cubes.

2. Apparatus as defined in claim 1 including means for mounting said cutter member on said supporting means to provide convenient removal of said member so that the articles can be received in the form of slices or strips from said passage in addition to providing quick interchangement of cutter members when cubes of different sizes are desired.

3. Apparatus as defined in claim 2 including a door member mounted on said housing, means defining said discharge passage in said door member, and means for conveniently removing said door member for interchangement with another door member having a different size passage therein to form strips or slices of a different size.

4. Apparatus as defined in claim 1 wherein said cutter member has peripheral grid-like knife means including a series of parallel spaced cutter rings connected by a series of straight cutter blades for cutting each slice extending from said passage into a plurality of cubes, and including hub means for rotatably supporting said cutter member on an axis of rotation parallel to the axis of rotation of said feed member.

5. Apparatus as defined in claim 4 including guide means mounted on said hub means for directing the cube outwardly from the interior of said cutter member.

6. Apparatus as defined in claim 4 including a stationary flat knife mounted within said passage, and wherein each said straight blade on said cutter member is mounted so that said blade is positioned substantially normal to said flat knife as said blade moves past said passage.

7. Apparatus as defined in claim 6 wherein the tangential velocity of said cutter cage is slightly greater than the tangential velocity of said feed member so that said cage has a velocity component in a direction parallel with said passage, which is substantially equal to the tangential velocity of said feed member to avoid squeezing, compressing or tearing of the slices within said passage.

References Cited

UNITED STATES PATENTS

| | | | |
|---|---|---|---|
| 2,163,878 | 6/1939 | Hornung | 146—78 |
| 2,242,557 | 5/1941 | Urschel | 146—78 |
| 2,923,337 | 2/1960 | Jouin | 146—78 |
| 3,010,497 | 11/1961 | Pease | 146—78 |

W. GRAYDON ABERCROMBIE, *Primary Examiner.*